(12) United States Patent
Hibino

(10) Patent No.: US 9,047,033 B2
(45) Date of Patent: Jun. 2, 2015

(54) IMAGE PROCESSING DEVICE, METHOD AND COMPUTER READABLE MEDIUM FOR TRANSMITTING MANAGEMENT INFORMATION

(75) Inventor: Masaaki Hibino, Mie (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 1480 days.

(21) Appl. No.: 12/149,893

(22) Filed: May 9, 2008

(65) Prior Publication Data

US 2008/0278754 A1 Nov. 13, 2008

(30) Foreign Application Priority Data

May 10, 2007 (JP) ................................. 2007-125535

(51) Int. Cl.
*G06F 3/12* (2006.01)
*H04N 1/00* (2006.01)

(52) U.S. Cl.
CPC ............ *G06F 3/1288* (2013.01); *G06F 3/1204* (2013.01); *G06F 3/1229* (2013.01); *G06F 3/1286* (2013.01); *H04N 1/00042* (2013.01); *H04N 1/0005* (2013.01); *H04N 1/00063* (2013.01); *H04N 1/00079* (2013.01); *H04N 1/00344* (2013.01); *H04N 2201/0039* (2013.01); *H04N 2201/0094* (2013.01)

(58) Field of Classification Search
USPC ........................................................ 358/1.15
See application file for complete search history.

(56) References Cited

U.S. PATENT DOCUMENTS

2001/0028473 A1* 10/2001 Yamasaki et al. ............ 358/1.15
2003/0229691 A1 12/2003 Ishimoto
2004/0107111 A1* 6/2004 Barts et al. ..................... 705/1
2004/0141201 A1 7/2004 Shima
2005/0018241 A1* 1/2005 Azami ........................ 358/1.15
2008/0034055 A1* 2/2008 Das et al. ...................... 709/217
2008/0180724 A1* 7/2008 Selvaraj ...................... 358/1.15

FOREIGN PATENT DOCUMENTS

| JP | 2000-059595 | 2/2000 |
| JP | 2004-13580 | 1/2004 |
| JP | 2004-185351 | 7/2004 |
| JP | 2005-4251 | 1/2005 |
| JP | 2006-163901 | 6/2006 |

OTHER PUBLICATIONS

Notification of Reasons for Rejection dated Aug. 23, 2011 received from the Japanese Patent Office from related Japanese Application No. 2007-125535, together with an English-language translation.

* cited by examiner

*Primary Examiner* — Huo Long Chen
(74) *Attorney, Agent, or Firm* — Scully, Scott, Murphy & Presser, P.C.

(57) ABSTRACT

There is provided an image processing device communicably connected to a network. The image processing device comprises a storage unit configured to store format information representing a format in which management information should be created; a condition obtaining unit configured to obtain condition information concerning conditions of the image processing device; a management information creation unit configured to create the management information, based on the condition information obtained by the condition obtaining unit, in the format represented by the format information stored in the storage unit; and a transmission unit configured to transmit the management information created by the management information creation unit to an external device.

21 Claims, 13 Drawing Sheets

| Event ID | Notification Type | Trigger Condition ID | Attention | Format |
|---|---|---|---|---|
| 1 | Report | C1 | test1@aaa.co.jp | Plain Text |
| 2 | Report | C2 | test2@aaa.co.jp | XML |
| 3 | Report | C3 | test3@aaa.co.jp | SQL |
| 4 | | | | |
| 5 | | | | |
| 6 | Notification | C10 | test1@aaa.co.jp | Plain Text |
| 7 | Notification | C11 | test2@aaa.co.jp | XML |
| 8 | Notification | C12 | test3@aaa.co.jp | SQL |
| 9 | | | | |
| 10 | | | | |

FIG. 3

| Trigger Condition ID | Condition | | |
| | Main | Sub | Time |
|---|---|---|---|
| C1 | Daily | | 0:00 |
| C2 | Weekly | Sun | 13:00 |
| C3 | Monthly | 1st | 22:00 |

FIG. 4

| Trigger Condition ID | Condition (OR Condition) | Times (Count Condition) | Minutes (Trigger Delay) |
|---|---|---|---|
| C10 | Cover Open | 1 | |
| | Paper Jams | 2 | |
| | Toner Low | | 10 |
| | Toner Life end | 1 | |
| | | | |
| C11 | Change Drum | 1 | |
| | Consumable Warning | 100 | |
| | | | |
| | | | |
| | | | |
| C12 | Paper Input Error | 10 | |
| | Paper Output Error | 10 | |
| | | | |
| | | | |
| | | | |

FIG. 5

```
<Header> --------------------------------------------------
From : brn9000f1@example.com
To : admin@brother.co.jp
DATA : Wed, 11 Oct 2006 10:15:18 +0900
Subject : E-mail report
Message-Id : <20070214120734.0E4D.brn9000f1@example.com>
MIME-Version : 1.0
Content-Type : text/plain : charset="US-ASCII"
Content-Transfer-Encoding : 7bit
<body> ----------------------------------------------------
10/11/2006 10:15

<Machine Information>
     Model Name : MFC-9440CN
     Serial no.   : ABC12345
     Firmware Version : A
     Location :
     Contact :
     IP Address : 169.254.001.001
     URL : http://169.254.001.001/main/main.html <Page Counter>
     Total Page Count : 20000
         Color : 10000
         B&W : 10000
     List/Fax : 10000
         Color : 10000
         B&W : 10000
     Copy : 10000
         Color :10000
         B&W : 10000
     Print : 10000
         Color : 10000
         B&W : 10000
           •
           •
           •
```

FIG. 6

```
<Header> -------------------------------------------------------------------
    From : brn9000f1@example.com
    To : admin@brother.co.jp
    DATA : Wed, 11 Oct 2006 10:15:18 +0900
    Subject : E-mail report
    Message-Id : <20070214115823.0E4D.brn9000f1@example,com>
    MIME-Version : 1.0
    Content-Type : application/octet-stream ; name="sample.xml"
    Content-Disposition : attachment ; filename="sample.xml
    Content-Transfer-Encoding : base64
<attached XML file> --------------------------------------------------------
<?xml version="1.0" encoding="UFT-8"?>
<xbpsdManagedaIanfo:xbpsdManageInfo>
    xmlns:xbpsdManagedInfo="http://schemas.brother.info/xxxxx/yyyyy/"
    xmlns:bpsdm="http://schemas.brother.info/xxxxx/yyyyy/zzzzz"
  <bpsdm:NetInfo>
    <bpsdm:URL>"http://10.136.12.34/main//main.html"</bpsdm:URL>
    <bpsdm:FirmwareVersion>1.01</bpsdm:FirmwareVersion>
    <bpsdm:NodeName>BRN123456 </bpsdm:NodeName>
    <bpsdm:IPAddress Version= "4">10.136.12.34 </bpsdm:IPAddress>
    <bpadm:MACAddress> 00:80:77:12:34:56 </bpadm:MACAddress>
    <bpadm:Location>Mizuho 1-5F</bpadm:Location>
    <bpadm:Contact>Mike Smith(2345)</bpadm:Contact>
  </bpsdm:NetInfo>
  <bpsdm:DeviceInfo>
    <bpadm:ModelName> Brother HL-4050CDN series </bpadm:Mode1Name>
    <bpadm:SerialName> 234567890 </bpadm:Seria1Name>
    <bpadm:PrinterFirmware> 0.24 </bpadm:PrinterFirmware>
  </bpsdm:DeviceInfo>
  <bpsdm:DeviceReport>
            •
            •
            •
```

FIG. 7

Configure E-mail report (1)Administrator Address    test1 @aaa. co. jp

Select Frequency
- ○ Daily
- ○ Weekly event   Sunday ▽
- ⦿ Every month on the : 1

Time    00 : 00

Report Format    Plain text ▽

☐ Send report now

[ Cancel ]    [ Submit ]

Example of Pull-Down
Plain text
XML
CSV
SQL

FIG. 8

Configure report (http)

(1) Destination URL: http://www.example1.com/report/post1

☐ Yes

Select Frequency:
○ Daily
○ Weekly event [Sunday ▽]
● Every month on the: [1]

Time: [00] : [00]

Report Format: [Plain text ▽]

☐ Send report now

[ Cancel ]  [ Submit ]

Example of Pull-Down
Plain text
XML
CSV
SQL

FIG. 10

Network Configuration

| Notification | E-mail report | Service | Ethernet | Port | Wireless | Interface | Certification |

Configure Notification

(1) Administrator Address — test1@aaa.co.jp (1) Send an e-mail when the problem has been resolved ☑

Specify when an e-mail is sent : 'Never' send an e-mail,'Always' send an e-mail the number of 'times' the problem must occur before an e-mail is sent or the number of 'minutes' the device should remain in an error state before an e-mail is sent.

| Type of error setting | Never | Always | Times | Minutes |
|---|---|---|---|---|
| Cover Open | ○ | ⦿ | ○ | ○ |
| Paper Jams | ○ | ○ | ⦿ 2 | ○ |
| Toner Low | ○ | ○ | ○ | ⦿ 10 |
| Toner Life End | ○ | ⦿ | ○ | ○ |
| Change Drum | ⦿ | ○ | ○ | ○ |
| Consumable Warnings (user repairable) | ⦿ | ○ | ○ | ○ |
| Consumable Error (user repairable) | ⦿ | ○ | ○ | ○ |
| Consumable Warnings (requires Service Engineer) | ⦿ | ○ | ○ | ○ |
| Consumable Error (requires Service Engineer) | ⦿ | ○ | ○ | ○ |
| Memory Errors | ⦿ | ○ | ○ | ○ |
| Paper Input Errors | ⦿ | ○ | ○ | ○ |
| Paper Output Errors | ⦿ | ○ | ○ | ○ |
| Installation Errors | ⦿ | ○ | ○ | ○ |
| Hardware / Mechanical Errors | ⦿ | ○ | ○ | ○ |
| Miscellaneous Errors | ⦿ | ○ | ○ | ○ |

Report Format — Plain text ▽

[ Cancel ]   [ Submit ]

EXAMPLE OF PULL-DOWN
Plain text
XML
CSV
SQL

FIG. 11

IMAGE PROCESSING DEVICE, METHOD AND COMPUTER READABLE MEDIUM FOR TRANSMITTING MANAGEMENT INFORMATION

CROSS-REFERENCE TO RELATED APPLICATION

This application claims priority under 35 U.S.C. §119 from Japanese Patent Application No. 2007-125535, filed on May 10, 2007. The entire subject matter of the application is incorporated herein by reference.

BACKGROUND

1. Technical Field

Aspects of the present invention relate to an image processing device which transmits management information concerning conditions thereof to an external device.

2. Related Art

Image processing devices configured to transmit management information concerning conditions thereof have been widely used. An example of such an image processing device is disclosed in Japanese Patent Provisional Publication No. 2005-4251 (hereafter, referred to as JP2005-4251A). The image processing device transmits management information (e.g., statuses of internal components, or usage statuses or life information of consumable components) to a predetermined destination device (i.e., an administrator's device), so that the administrator is able to check and analyze the conditions of the image processing device from a remote location.

SUMMARY

However, the image processing device disclosed in JP2005-4251A has a drawback that the management information provided to the administrator is not suitable for computer processing because the management information is created as a file in a text format.

Aspects of the present invention are advantageous in that an image processing device capable of transmitting management information to a destination device in a format suitable for the destination device is provided.

According to an aspect of the invention, there is provided an image processing device communicatably connected to a network. The image processing device comprises a storage unit configured to store format information representing a format in which management information should be created; a condition obtaining unit configured to obtain condition information concerning conditions of the image processing device; a management information creation unit configured to create the management information, based on the condition information obtained by the condition obtaining unit, in the format represented by the format information stored in the storage unit; and a transmission unit configured to transmit the management information created by the management information creation unit to an external device.

By using the format information stored in the storage unit, it is possible to transmit the management information to a target destination device in a desired format suitable for processing for the target destination device.

According to another aspect of the invention, there is provided a method for transmitting management information, comprising the steps of: storing, in a storage unit, format information representing a format in which management information should be created; obtaining condition information concerning conditions of an image processing device; creating the management information, based on the obtained condition information, in the format represented by the format information stored in the storage unit; and transmitting the created management information to an external device.

By using the format information stored in the storage unit, it is possible to transmit the management information to a target destination device in a desired format suitable for processing for the target destination device.

According to another aspect of the invention, there is provided a computer readable medium having computer readable instruction stored thereon, which, when executed by a processor of an image processing device, configures the processor to perform the steps of: storing, in a storage unit, format information representing a format in which management information should be created; obtaining condition information concerning conditions of an image processing device; creating the management information, based on the obtained condition information, in the format represented by the format information stored in the storage unit; and transmitting the created management information to an external device.

By using the format information stored in the storage unit, it is possible to transmit the management information to a target destination device in a desired format suitable for processing for the target destination device.

In at least one aspect, the condition obtaining unit comprises an event detection unit configured to detect an event occurring on the image processing device, the storage unit configured to store a plurality of pieces of format information while associating the plurality of pieces of format information with a plurality of pieces of destination information, respectively, the management information creation unit is configured to determine a format in which management information should be created in accordance with a type of the event detected by the event detection unit, and to create the management information in the determined format based on the condition information, and the transmission unit is configured to transmit the management information created by the management information creation unit to a predetermined destination device represented by one of the plurality of pieces of destination information associated with one of the plurality of pieces of format information corresponding to the determined format.

In at least one aspect, the storage unit is configured to store a plurality of pieces of format information while associating the plurality of pieces of format information with a plurality of pieces of destination information, respectively. The management information creation unit is configured to further consider a type of a destination device to which the management information should be transmitted, to determine a format in which management information should be created in accordance with the type of the destination device, and to create the management information in the determined format. Further, the transmission unit is configured to transmit the management information created by the management information creation unit to the destination device by obtaining the destination information of the destination device from the storage unit.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIG. 3 illustrates a notification condition management table.

FIG. 4 illustrates a trigger condition management table for first types of trigger conditions.

FIG. 5 illustrates a trigger condition management table for second types of trigger conditions.

FIG. 6 illustrates an example of management information created in a format of "Plain Text".

FIG. 7 illustrates an example of management information created in a format of "XML".

FIG. 8 illustrates a setting screen displayed on a display of a management computer having a real-time clock when a tab of a notification type "E-mail Report" is selected.

FIG. 10 illustrates a setting screen displayed on the display of the management computer when a tab of a notification type "Report" is selected.

FIG. 11 illustrates a setting screen displayed on the display of the management computer when a tab of a notification type "Notification" is selected.

DETAILED DESCRIPTION

Hereafter, an embodiment according to the invention will be described with reference to the accompanying drawings.

Figure 1:
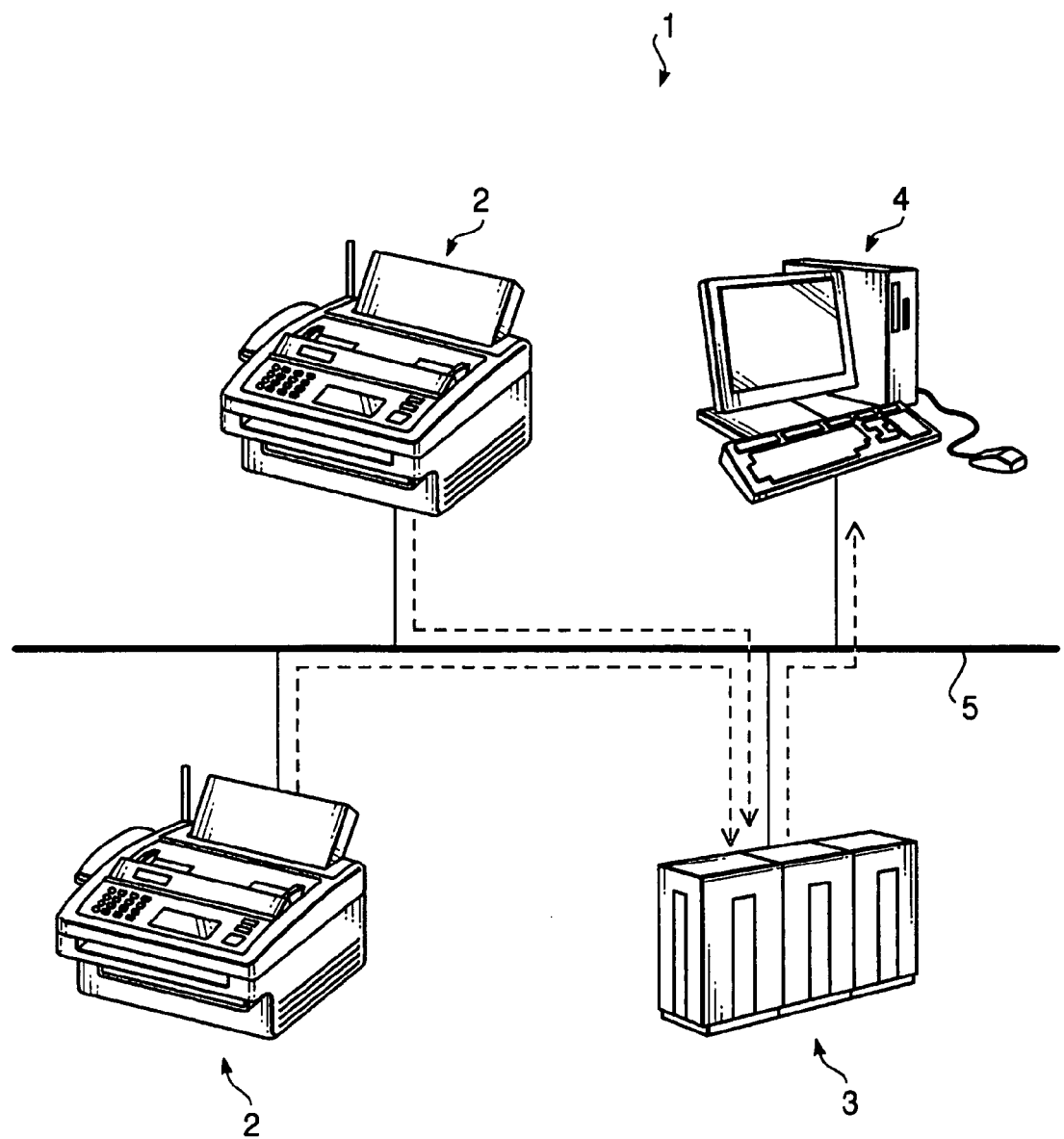
FIG. 1 illustrates a system configuration of an image processing system according to an embodiment.
Figure 2:
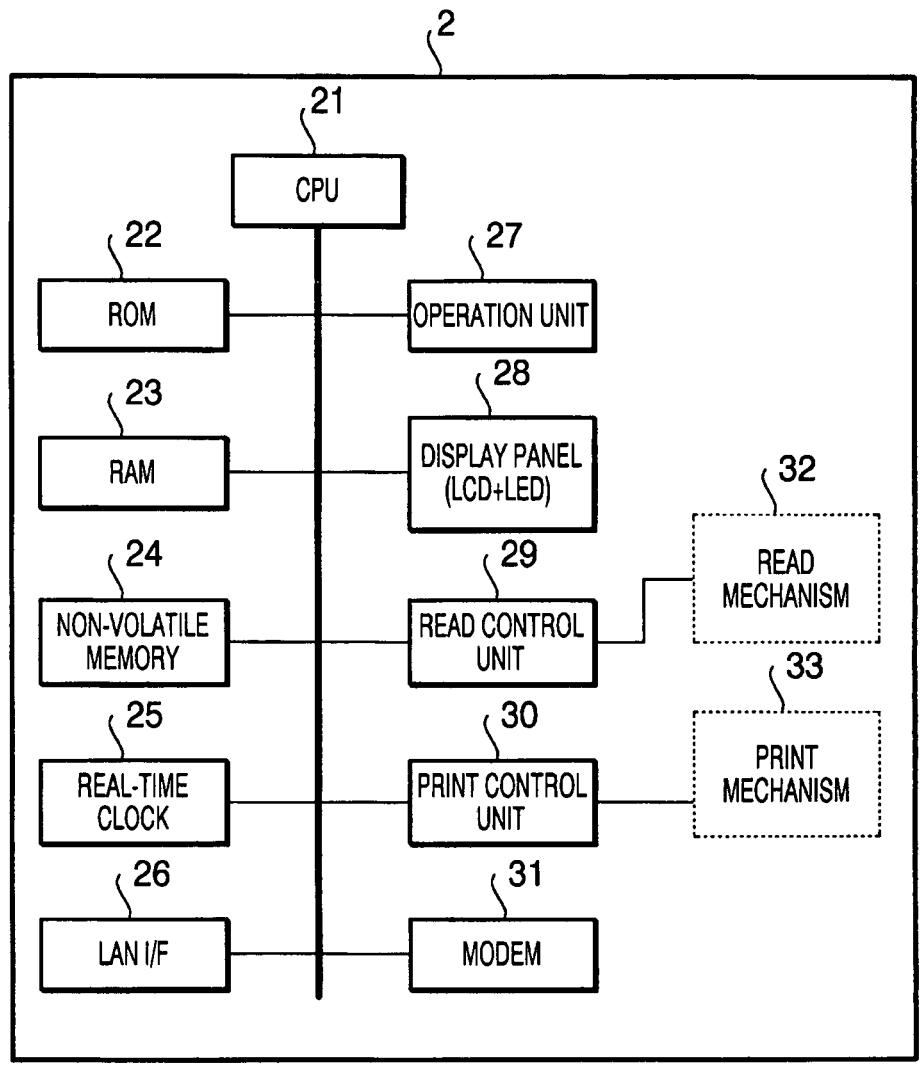
FIG. 2 is a block diagram of an MFP provided in the image processing system.

FIG. 1 illustrates a system configuration of an image processing system 1 according to an embodiment. FIG. 2 is a block diagram of an MFP (multifunction peripheral) 2 provided in the image processing system 1.

As shown in FIG. 1, the image processing system 1 includes a plurality of MFPs 2, a mail server 3, and a management computer 4 which are communicatably connected to each other via a LAN 5. It should be understood that two MFPs are illustrated in FIG. 2 by way of example, and a different number of MFPs may be provided in the image processing system 1. Since the MFPs 2 have substantially the same configuration, in the following the configuration of one MFP 2 is explained.

As shown in FIG. 2, the MFP 2 includes a CPU 21, a ROM 22, a RAM 23, a non-volatile memory 24, a real-time clock 25, a LAN interface 26, an operation unit 27 including various keys, a display panel 28, a read control unit 29, a print control unit 30, a modem 31, a read mechanism 32, and a print mechanism 33. The CPU 21 controls the internal components of the MFP 2 in accordance with one or more programs stored in the ROM 22.

More specifically, the CPU 21 accepts, from an external device (e.g., the management computer 4), an input of format information indicating a format in which management information should be generated, through the LAN interface 26 or the modem 31. The CPU 21 is also able to accept an input of format information inputted by a user, through a menu screen displayed on the display panel 28, by operating the operation unit 27. As described later, the menu screen is configured to have an item for designating the format information.

As described in detail later, the MFP 2 has a notification condition management table storing at least one record containing a format field for the format information (see FIG. 3). The CPU 21 creates management information based on conditions of the MFP 2 in a format designated by the format information contained in a record of the notification condition management table. The management information includes, for example, statuses of internal components of the MFP 2, or usage statuses or life information of consumable components of the MFP 2.

The CPU 21 transmits the management information to a destination device indicated by destination information to which the format information is related (see FIG. 4). That is, the CPU 21 creates the management information in accordance with the format information related to the destination information, and transmits the management information to a destination device (a destination address) indicated by the destination information through the LAN interface 26 or the modem 31. The format information may be accepted through the operation unit 27.

The ROM 22 stores various programs including a program for transmitting a certain type of management information to a predetermined destination device in a predetermined format when a predetermined condition is satisfied.

The non-volatile memory 34 is able to maintain data in a power-off state. The RAM 23 and the non-volatile memory 34 store various types of data including the management information, the notification condition management table, and trigger condition management tables (see FIGS. 4 and 5).

As shown in FIG. 3, the notification condition management table includes a plurality of records, each of which contains fields of an event identification ("Event ID"), a notification type ("Notification Type"), a trigger condition ("Trigger Condition ID"), a destination address ("Attention"), and format information ("Format"). The "Event ID" is assigned uniquely to each of the records.

The "Format" is information for designating a type of format in which the management information is generated. For example, text information, such as, "Plaintext", is used as the format information.

The "Notification Type" is information representing a condition to be satisfied to notify an administrator of the management information. In the notification condition management table, one of two notification types "Report" and "Notification" can be set as the "Notification Type". The "Report" represents a notification type for transmitting periodically the management information to the administrator. The "Notification" represents a notification type for transmitting the management information when a certain event occurs.

The "Trigger Condition ID" is an ID assigned uniquely to each of trigger conditions which are used to set detailed conditions for determining the notification type. More specifically, when the trigger ID is one of C1, C2 and C3, the trigger condition management table shown in FIG. 4 is consulted. On the other hand, when the trigger ID is one of C10, C11 and C12, the trigger condition management table shown in FIG. 5 is consulted.

In FIG. 4, the trigger condition of "C1" indicates that the management information is transmitted at 0:00 every day, the trigger condition of "C2" indicates that the management information is transmitted at 13:00 every Sunday, and the trigger condition of "C3" indicates that the management information is transmitted at 22:00 on the 1st every month.

In FIG. 5, the trigger condition of "C10" indicates that when at least one of an event where a predetermined cover of the MFP 2 is opened once ("Cover Open"), an event where paper jams occur two times ("Paper Jams"), an event where the amount of toner becomes lower than or equal to a predetermined amount ("Toner Low"), an event where the toner has reached to the end of its life ("Toner Life End") occurs, the management information is transmitted. Regarding the event "Toner Low", a trigger delay time is set so that the management information is transmitted if the toner low state is maintained for the trigger delay time. That is because there is a possibility that a sensor for sensing the toner amount accidentally detects a toner low state when the toner amount decreases to the predetermined amount. In the example of FIG. 5, the trigger delay time of 10 minutes is set.

The trigger condition of "C11" indicates that when at least one of an event where a photosensitive drum has reached a replacement time ("Change Drum"), and an event where errors (e.g., a memory fault error or a memory full error) related to a predetermined consumable part (including an internal component of the MFP 2) occur 100 times ("Consumable Warning") occurs, the management information is transmitted.

The trigger condition of "C12" indicates that at least one of an event where errors of paper empty occur 10 times ("Paper Input Error"), and an event where errors of ejected paper-full occur 10 times ("Paper Output Error") occurs, the management information is transmitted.

As shown in FIG. 3, "Attention" in the notification condition management table represents a destination address to which the management information should be transmitted. "Format" in the notification condition management table indicates a format in which the management information should be created. For example, a format can be selected from "Plain Text", "XML" and "SQL". FIG. 6 illustrates an example of management information created in the format of "Plain Text". Since the management information shown in FIG. 6 is created as a text file, the management information is easy to read for the administrator, but is not suitable for computer processing.

FIG. 7 illustrates an example of the management information created in the format of "XML". The management information created in the format of "XML" or "SQL" is not easy to read for the administrator, but is suitable for computer processing.

Returning now to FIG. 2, the real time clock 25 is a clocking unit. The LAN interface 26 interfaces the MFP 2 with the LAN 5. Through the LAN interface 26, the MFP 2 receives event information from the management computer 4, and transmits the management information to an external device on the LAN 5.

The operation unit 27 includes keys to be used by a user, for example, to make settings of the MFP 2. On the display panel 28, various types of information (e.g., information for settings) are displayed.

The read control unit 29 controls the read mechanism 32 for a reading operation. The print control unit 30 controls the print mechanism 33 for a printing operation. Control information which the print control unit 30 uses to control the print mechanism 33 is outputted to the RAM 23 or the non-volatile memory 24 so that the control information is saved as the management information.

The modem 31 has the function of converting digital data into sound data to output the sound data to a telephone network and the function of converting received sound data into digital data. The read mechanism 32 has a general configuration to read information from an original when the facsimile function of the MFP 2 is used.

The mail server 3 has a configuration as a general-purpose mail server including a CPU, a ROM, a RAM, a non-volatile memory, a real-time clock, a LAN interface, a keyboard, a mouse and a display. The management computer 4 has a configuration as a general-purpose computer including a CPU, a ROM, a RAM, a non-volatile memory, a real-time clock, a LAN interface, a keyboard, a mouse and a display.

When a predetermined program is loaded from a storage medium (e.g., a hard disk drive) and is executed by the CPU of the mail server 3, the mail server 3 executes the function of transmitting the management information which was received from the MFP 2, to the management computer 4.

The management computer 4 is configured to allow the administrator to make settings, such as, the notification type and the format, through the mouse or keyboard of the management computer 4. That is, the management computer 4 serves as a reception unit for accepting a user input in cooperation with the components (e.g., the LAN interface 26 or the modem 31) of the MFP 2. FIGS. 8 to 11 illustrate setting screens for making settings displayed on the display of the management computer 4. Transition between the setting screens of FIGS. 8 to 11 can be made by selecting one of tabs "Notification" and "E-mail report" which are located on the top of each screen. These tabs are only illustrated in FIG. 11 and are omitted in FIGS. 8 to 10 for the sake of simplicity. Further, in FIG. 11, a tab of the notification type "Report" corresponding to the setting screen of FIG. 10 is omitted.

The setting screen shown in FIG. 8 is displayed on the display of the management computer 4 when the tab of the notification type "E-mail Report" is selected to transmit the management information by an e-mail and the MFP 2 has the real-time clock 25. In the setting screen of FIG. 8, a field on the right side of "Administrator Address" is used to input an e-mail address as an example of destination information. On the right side of "Select Frequency", items including radio buttons for setting timings when the management information is transmitted are located. Fields on the right side of "Time" can be used to input a time when the management information is transmitted.

On the right side of "Report Format", a pull-down menu for selecting a format of the management information from "Plaintext", "XML", "CSV" and "SQL" is located. Under the pull-down menu, a check box for causing the MFP 2 to transmit the management information immediately after finishing the setting on this setting screen is located. When a button "Submit" at the lower right portion of the setting screen is pressed after the setting operation is finished on this screen, the inputted settings are transmitted to the MFP 2 and are recorded in the notification condition management table and trigger condition management tables.

Figure 9:
FIG. 9 illustrates a setting screen displayed on the display of the management computer not having the real-time clock when a tab of a notification type "E-mail Report" is selected.

The setting screen shown in FIG. 9 is displayed on the display of the management computer 4 when the tab of the notification type "E-mail Report" is selected to transmit the management information by an e-mail and the MFP 2 does not have the real-time clock 25. The setting screen of FIG. 9 has the similar items of the setting screen of FIG. 8. However, as distinct from the setting screen of FIG. 8, the items "Power on", "hour(s)" and "day(s)" are located on the right side of "Select Frequency". With this configuration, it is possible to transmit the management information at power-on or at the time when a predetermined time or predetermined days have elapsed from power-on regardless of the current time.

The setting screen shown in FIG. 10 is displayed on the display of the management computer 4 when the tab of the notification type "Report" is selected to directly transmit the management information from the MFP 2 to the management computer 4 without intervention by the mail server 3 and the MFP 2 has the real-time clock 25. Although the setting screen of FIG. 10 has the similar items of the setting screen of FIG. 9, an item "Destination URL" is located in place of "Administrator Address". In a filed at the right side of "Destination URL", an address on the Internet can be inputted as an example of the destination information.

The setting screen shown in FIG. 11 is displayed on the display of the management computer 4 when the tab of the notification type "Notification" is selected. The central part of the setting screen of FIG. 11 includes radio buttons for selecting events including a cover open event, a toner low event, a toner life end event, and fields for designating in detail the number of times of events occurred and the delay time. Under these radio buttons and the fields, a pull-down menu for selecting a format ("Report Format") of the management information is located. When a button "Submit" at the lower right portion of the setting screen is pressed after the setting operation is finished on this screen, the inputted settings are transmitted to the MFP 2 and are recorded in the notification condition management table and trigger condition management tables.

Figure 12:
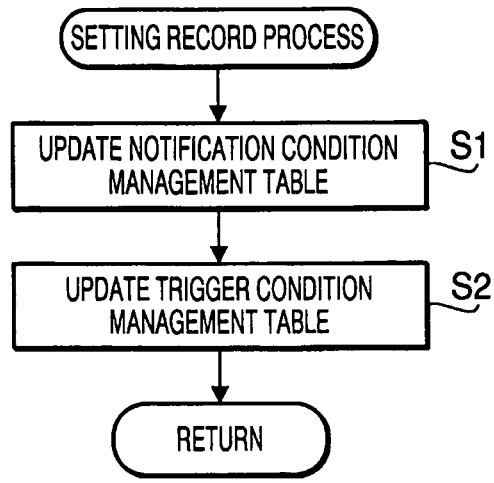
FIG. 12 is a flowchart illustrating a setting record process executed by the MFP.
Figure 13:
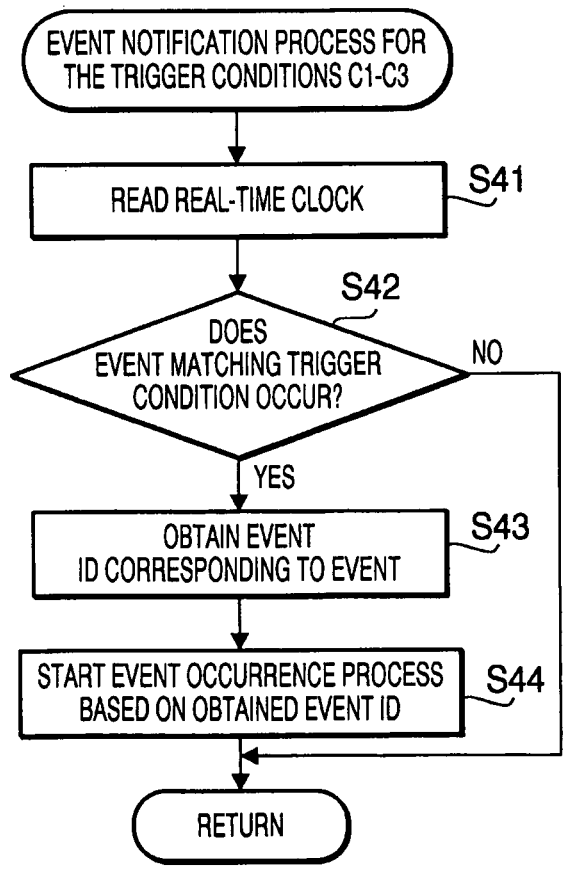
FIG. 13 is a flowchart illustrating an event notification process executed by the MFP for the first types of trigger conditions.
Figure 14:
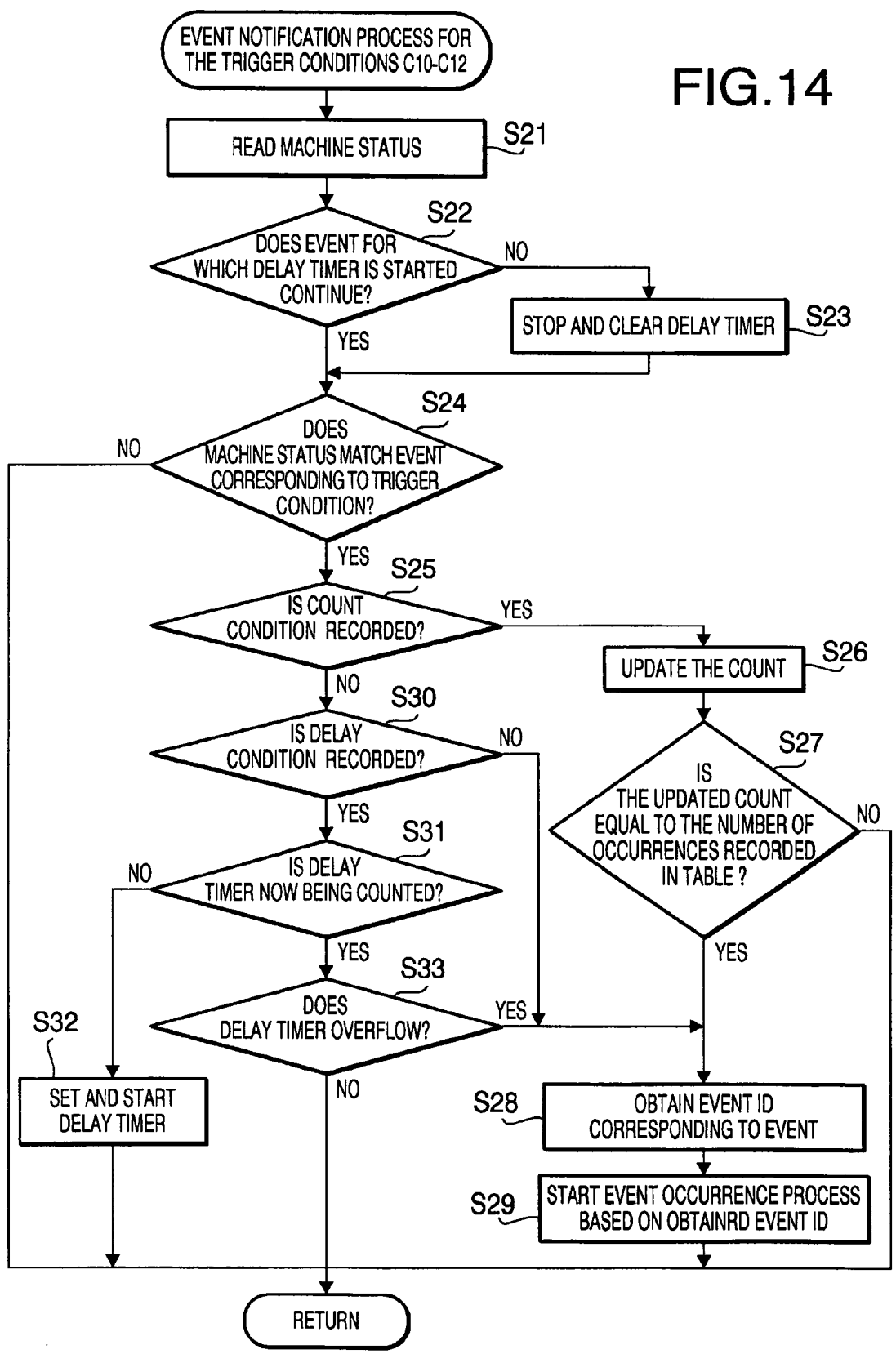
FIG. 14 is a flowchart illustrating an event notification process executed by the MFP for the second types of trigger conditions.

Hereafter, operations of the MFP 2 are explained. FIG. 12 is a flowchart illustrating a setting record process executed under control of the CPU 21 of the MFP 2. FIG. 13 is a flowchart illustrating an event notification process executed for the trigger conditions of C1-C3. FIG. 14 is a flowchart illustrating an event notification process executed for the trigger conditions of C10-C12.

When the settings inputted through the above mentioned setting screen are transmitted from the management computer 4 and are received by the MFP 2 through the LAN interface 26 or the modem 31, the CPU 21 of the MFP 2 starts the setting record process. First, the CPU 21 extracts data concerning the notification condition management table from the received settings, and records the extracted data in the notification condition management table to update the notification condition management table (step S1). Then, the CPU 21 extracts data concerning the trigger condition management tables from the received settings, and records the extracted data in the trigger condition management tables to update the trigger condition management tables (step S2). The setting record process is performed every time the MFP 2 receives the settings from the management computer 4.

Hereafter, the event notification process for the trigger conditions C1-C3 is explained with reference to FIG. 13. The CPU 21 of the MFP 2 executes the event notification process shown in FIG. 13 periodically at predetermined time intervals to make a notification regarding the occurrence of an event. First, the CPU 21 obtains the current time from the real time clock 25 (step S41). Then, in step S42, the CPU 21 judges whether an event matching the obtained trigger condition (one of the trigger conditions C1-C3 in "Condition" shown in FIG. 4) occurs.

If an event matching the obtained trigger condition occurs (S42: YES), the CPU 21 consults the notification condition management table (FIG. 3) to obtain the event ID corresponding to the trigger condition ID of the event (step S43). Then, the CPU 21 starts an event occurrence process based on the obtained event ID (step S44). If no event corresponding to the trigger condition ID of the event occurs (S42: NO), the CPU 21 terminates the event notification process.

Hereafter, the event notification process for the trigger conditions C10-C12 is explained with reference to FIG. 14. In addition to executing the event notification process for the trigger conditions of C1-C3, the CPU 21 executes the event notification process for the trigger conditions C10-C12 periodically at predetermined time intervals to make a notification regarding the occurrence of an event.

First, the CPU 21 reads machine status information provided by the print control unit 30 (step S21). Then, the CPU 21 judges whether an event for which a delay timer is started continues (step S22). If no event for which a delay timer is started continues (S22: NO), the CPU 21 stops and clears the delay timer (step S23). Then, control proceeds to step S24.

If an event for which a delay timer is started continues (S22: YES), control proceeds to step S24 where the CPU 21 judges whether the machine status obtained in S21 matches an event corresponding to the trigger condition (one of the trigger conditions C10-C12 in "Condition" shown in FIG. 5).

If the obtained machine status does not match an event corresponding to the trigger condition (S24: NO), the CPU 21 terminates the event notification process. If the obtained machine status matches an event corresponding to the trigger condition (S24: YES), the CPU 21 judges whether a condition of the number of occurrences (i.e., a count condition) is recorded in the trigger condition management table in association with the event (step S25).

If a condition of the number of occurrences is recorded in association with the event (S25: YES), the CPU 21 updates the count for counting the number of occurrences of the event (step S26). The count for counting the number of occurrences of an event may be stored in the non-volatile memory 24 in association with the event.

After step S26 is processed, the CPU 21 judges whether the count updated in step S26 is equal to the number of occurrences recorded in the trigger condition management table in association with the event (step S27). If the count updated in step S26 is not equal to the number of occurrences recorded in the trigger condition management table in association with the event (S27: NO), the CPU 21 terminates the event notification process.

If the count updated in step S26 is equal to the number of occurrences recorded in the trigger condition management table in association with the event (S27: YES), the CPU 21 consults the notification condition management table to obtain the event ID corresponding to a record containing the trigger condition corresponding to the event detected in step S24 (step S28). After step S28 is processed, the CPU 21 starts the event occurrence process shown in FIG. 15 based on the obtained event ID (step S29). After step S29 is processed, the CPU 21 terminates the event notification process.

If no condition of the number of occurrences is recorded in association with the event (S25: NO), the CPU 21 judges whether a condition regarding a delay is recorded in association with the event (step S30). If no condition regarding a delay is recorded (S30: NO), control proceeds to step S28 where the CPU 21 obtains the event ID. If a condition of a delay is recorded (S30: YES), the CPU 21 judges whether the delay timer is now being counted (i.e., whether the delay timer is running) (step S31). If the delay timer is not running (S31: NO), the CPU 21 sets a delay timer and starts the delay timer (step S32). After step S32 is processed, the CPU 21 terminates the event notification process.

If the delay timer is running (S31: YES), the CPU 21 judges whether the count of the delay timer overflows (step S33). If the delay timer overflows (S33: YES), control proceeds to step S28 to obtain the event ID corresponding to a record containing the trigger condition corresponding to the event detected in step S24. If the delay timer does not overflow (S33: NO), the CPU 21 terminates the event notification process.

Figure 15:
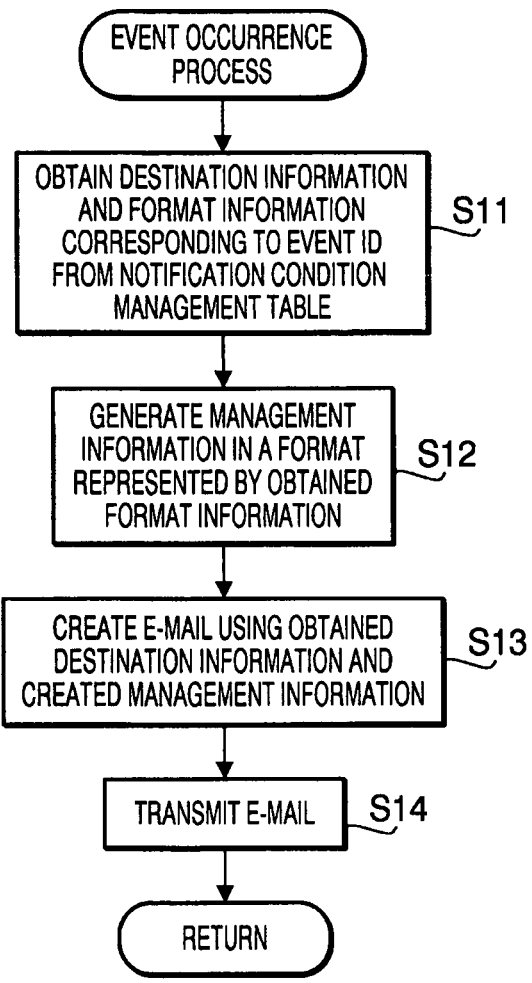
FIG. 15 is a flowchart illustrating an event occurrence process executed by the MFP.

Hereafter, the event occurrence process is explained with reference to FIG. 15. The event occurrence process is started in step S44 of FIG. 13 and in step S29 of FIG. 14. First, the CPU 21 obtains the destination information and the format information corresponding to the event ID from the notification condition management table (step S11). For example, if the event ID is 1 (one), the CPU 21 obtains, in accordance with the "Event ID" of "1", the destination information "test1@aaa.co.jp" and the format information "PlainText" from the notification condition management table.

After step S11 is processed, the CPU 21 obtains predetermined information corresponding to the event ID to create the management information in a format represented by the obtained format information (step S12). For example, if the "Event ID" of "1" is obtained, the CPU 21 obtains information corresponding to the "Event ID" of "1" to generate the management information in a format of "PlainText". In other words, the CPU 21 checks the format information in a record corresponding to the "Event ID" of "1", and if the checked format information is "PlainText", the CPU 21 creates the management information in a format of "PlainText". On the other hand, if the checked format information is "XML", the CPU 21 creates the management information in an XML format.

After step S12 is finished, the CPU 21 creates an e-mail using the obtained destination information and the created management information (step S13). Then, the CPU 21 transmits the e-mail to a destination address corresponding to the obtained destination information (step S14). For example, if "Event ID" of "1" is obtained, the CPU 21 inputs "test1@aaa.co.jp" in a mail address field of the e-mail and inputs the management information created in a format of "PlainText" in a body part of the e-mail. Then, the CPU 21 transmits this e-mail. In other words, when the CPU 21 creates the management information in a format of "PlainText", the CPU 21 transmits the management information in a format of "PlainText". On the other hand, when the CPU 21 creates the management information in a different format (e.g., an XML format), the CPU 21 transmits the management information in a different format (e.g., an XML format). After step S14 is finished, control returns to a main flow (e.g., the event notification process shown in FIG. 13 or 14). As described above, the event occurrence process is executed each time one of predetermined events occurs.

As described above, according to the embodiment, the following advantages can be achieved. Since the management information is created in a format designated through the management computer 4, a user is allowed to input a desired format in which the management information is created. Consequently, it is possible to transmit the management information in a desired format designated by the user. In the notification condition management table, a plurality of pieces of format information are stored while being associated with a plurality of pieces of destination information, respectively. Therefore, it is possible to transmit the management information, to each of destination devices, in a format suitable for each of the destination devices.

The above mentioned operations of the MFP 2 may be implemented by determining a format in which management information should be created in accordance with a type of the event, and creating the management information in the determined format.

Alternatively, the operations of the MFP 2 may be implemented by determining a format in which management information should be created in accordance with a type of a destination device to which the management information should be transmitted, and creating the management information in the determined format.

Although the present invention has been described in considerable detail with reference to certain preferred embodiments thereof, other embodiments are possible.

For example, the functions implemented in the above mentioned image processing system 1 may be implemented on a single multifunction peripheral. In this case, the multifunction peripheral is configured to accept the input of the settings through the operation unit and the display panel thereof.

In the above mentioned embodiment, the format information is formed of text information, such as, "PlainText". However, various types of information (e.g., numbers) can be used as the format information.

In the setting screen of the above mentioned embodiment, a format is selected from a pull-down menu. However, the setting screen may be configured to allow a user to designate a format through various types of items (e.g., radio buttons).

What is claimed is:

1. An image processing device configured to be connected to a network, comprising:
a storage unit;
a processor comprising hardware; and
memory storing instructions, that, when executed by the processor, causes the image processing device to:
receive a first record, the first record comprising a first trigger condition, a first format information representing a first document format and a first destination information, the first trigger condition corresponding to a plurality of first error conditions for the image processing device, each first error condition having at least one trigger threshold;
store the first record and a first event identification in the storage unit, wherein the first event identification is associated with the first trigger condition, the first format information and the first destination information in the storage unit;
receive a second record, the second record comprising a second trigger condition, a second format information representing a second document format and a second destination information, the second trigger condition corresponding to a plurality of second error conditions, each second error condition having at least one error threshold;
store the second record and a second event identification in the storage unit, wherein the second event identification is associated with the second trigger condition, the second format information and the second destination information in the storage unit, the second format being different from the first format;
obtain condition information related to conditions of the image processing device;
determine whether the obtained condition information indicates an error condition corresponding to the first trigger condition or the second trigger condition;
determine whether the at least one trigger threshold is satisfied for the determined error condition;
determine one of the first event identification and the second event identification respectively corresponding to the first trigger condition and the second trigger condition based on the determined error condition if the at least one trigger threshold is satisfied;

determine one of the first destination information and the second destination information, and one of the first format information and the second format information, from the determined one of the first event identification and the second event identification;

generate, when the at least one trigger threshold is satisfied for an error condition corresponding to the first trigger condition, first management information in a document format represented by the first format information stored in the storage unit corresponding to the determined event identification and the first trigger condition, wherein the first management information comprises a first content related to the obtained condition information described in the first document format, and to generate, when the at least one trigger threshold is satisfied for an error condition corresponding to the second trigger condition, second management information in a document format represented by the second format information stored in the storage unit corresponding to the determined event identification and the second trigger condition, wherein the second management information comprises a second content related to the obtained condition information described in the second document format; and transmit, by using a particular protocol, the first management information to an external device in accordance with the determined destination information corresponding to the event identification, and to transmit, by using the particular protocol, which is the same protocol as the particular protocol used when the first management information is transmitted, the second management information to the external device in accordance with the determined destination information corresponding to the event identification, wherein when the at least one trigger threshold is satisfied for an error condition corresponding to the first trigger condition, the determined destination information is the first destination information and when the at least one trigger threshold is satisfied for an error condition corresponding to the second trigger condition, the determined destination information is the second destination information.

2. The image processing device according to claim 1, wherein the first and second format information are externally inputted to the storage unit.

3. The image processing device according to claim 1, further comprising a setting unit configured to accept an input for setting the first and second format information, wherein the first and second format information accepted through the setting unit is stored in the storage unit.

4. The image processing device according to claim 3, wherein:

the setting unit is configured to accept an input for setting destination information concerning a destination device to which the first or second management information should be transmitted; and the storage unit is configured to store the destination information while associating the destination information with the first or second format information.

5. The image processing device according to claim 1, wherein the processor transmits either the first or second management information to the external device when the at least one trigger threshold is satisfied.

6. The image processing device according to claim 1, wherein:

the processor is configured to further consider a type of a destination device to which management information should be transmitted, to determine a format in which management information should be created in accordance with the type of the destination device, and to create the management information in the determined format, and to transmit the management information to the destination device by obtaining the destination information of the destination device from the storage unit.

7. The image processing device according to claim 1, wherein the at least one trigger threshold is selected from a group consisting of a number of times the error is determined and a time delay.

8. A method for transmitting management information, comprising the steps of:

receiving a first record, the first record comprising a first trigger condition, a first format information representing a first document format and a first destination information, the first trigger condition corresponding to a plurality of first error conditions for the image processing device, each first error condition having at least one trigger threshold;

storing, in a storage unit, the first record and a first event identification, wherein the first event identification is associated with the first trigger condition, the first format information and the first destination information in the storage unit;

receiving a second record, the second record comprising a second trigger condition, a second format information representing a second document format and a second destination information, the second trigger condition corresponding to a plurality of second error conditions, each second error condition having at least one trigger threshold;

storing, in the storage unit, the second record and a second event identification, wherein the second event identification is associated with the second trigger condition, the second format information and the second destination information in the storage unit, the second format being different from the first format;

obtaining condition information related to conditions of an image processing device;

determining whether the obtained condition information indicates an error condition corresponding to the first trigger condition or the second trigger condition;

determining whether the at least one trigger threshold is satisfied for the determined error condition;

determining one of the first event identification and the second event identification respectively corresponding to the first trigger condition and the second trigger condition based on the determined error condition if the at least one trigger threshold is satisfied;

determining one of the first destination information and the second destination information, and one of the first format information and the second format information, from the determined one of the first event identification and the second event identification;

creating, when the at least one trigger threshold is satisfied for an error condition corresponding to the first trig e condition, first management information in a document format represented by the format information stored in the storage unit corresponding to the determined event identification and the first trigger condition, wherein the first management information comprises a first content related to the obtained condition information described in the first document format; or creating, when the at least one trigger threshold is satisfied for an error condition corresponding to the second trigger condition, second management information in a document format represented by the format information stored in the storage unit corresponding to the determined event identification and the second trigger condition, wherein the second management information comprises a second content related to the obtained condition information described in the second document format;

transmitting, by using a particular protocol, the created first management information to an external device in accordance with the determined destination information corresponding to the event identification; and transmitting, by using the particular protocol, which is the same protocol as the particular protocol used when the first management information is transmitted, the created second management information to the external device in accordance with the determined destination information corresponding to the event identification, wherein when the at least one trigger threshold is satisfied for an error condition corresponding to the first trigger condition, the determined destination information is the first destination information and when the at least one trigger threshold is satisfied for an error condition corresponding to the second trigger condition, the determined destination information is the second destination information.

9. The method according to claim 8, further comprising the step of accepting an input for setting the first and second format information, wherein the accepted first and second format information is stored in the storage unit.

10. The method according to claim 9, wherein:

in the step of accepting, an input for setting destination information concerning a destination device to which the first or second management information should be transmitted is accepted; and in the step of storing, the destination information is stored while being associated with the first or second format information.

11. The method according to claim 8, wherein in the step of transmitting, the first or second management information is transmitted to the external device when at least one trigger threshold is satisfied.

12. A non-transitory computer readable medium having computer readable instruction stored thereon, which, when executed by a processor of an image processing device, configures the processor to perform the steps of:

receiving a first record, the first record comprising a first trigger condition, a first format information representing a first document format and a first destination information, the first trigger condition corresponding to a plurality of first error conditions for the image processing device, each first error condition having at least one trigger threshold;

storing, in a storage unit, the first record and a first event identification, wherein the first event identification is associated with the first trigger condition, the first format information and the first destination information in the storage unit;

receiving a second record, the second record comprising a second trigger condition, a second format information representing a second document format and a second destination information, the second trigger condition corresponding to a plurality of second error conditions, each second error condition having at least one trigger threshold;

storing, in the storage unit, the second record and a second event identification, wherein the second event identification is associate with the second trigger condition, the second format information and the second destination information in the storage unit, the second format being different from the first format;

obtaining condition information related to conditions of an image processing device;

determining whether the obtained condition information indicates an error condition corresponding to the first trigger condition or the second trigger condition;

determining whether the at least one trigger threshold is satisfied for the determined error condition;

determining one of the first event identification and the second event identification respectively corresponding to the first trigger condition and the second trigger condition based on the determined error condition if the at least one trigger threshold is satisfied;

determining one of the first destination information and the second destination information, and one of the first format information and the second format information, from the determined one of the first event identification and the second event identification;

creating, when the at least one trigger threshold is satisfied for an error condition corresponding to the first trigger condition, first management information in a document format represented by the format information stored in the storage unit, corresponding to the determined event identification and the first trigger condition, wherein the first management information comprises a first content related to the obtained condition information described in the first document format; or creating, when the at least one trigger threshold is satisfied for an error condition corresponding to the second trigger condition, second management information in a document format represented by the format information stored in the storage unit corresponding to the determined event identification and the second trigger condition, wherein the second management information comprises a second content related to the obtained condition information described in the second document format;

transmitting, by using a particular protocol, the created first management information to an external device in accordance with the determined destination information corresponding to the event identification; and transmitting, by using the particular protocol, which is the same protocol as the particular protocol used when the first management information is transmitted, the created second management information to the external device in accordance with the determined destination information corresponding to the event identification, wherein when the at least one trigger threshold is satisfied for an error condition corresponding to the first trigger condition, the determined destination information is the first destination information and when the at least one trigger threshold is satisfied for an error condition corresponding to the second trigger condition, the determined destination information is the second destination information.

13. The non-transitory computer readable medium according to claim 12, wherein the method further comprising the step of accepting an input for setting the first and second format information, wherein the accepted first and second format information is stored in the storage unit.

14. An image processing device configured to be connected to a network, comprising:

a storage unit;

a processor comprising hardware; and memory storing instructions, that, when executed by the processor, causes the image processing device to:

receive a first record, the first record comprising a first trigger condition, a first format information representing a first document format and a first destination information, the first trigger condition corresponding to a first time-related reporting condition of management information to be transmitted in accordance with the first destination information;

store the first record and a first event identification in the storage unit, wherein the first event identification is associated with the first trigger condition, the first format information and the first destination information in the storage unit;

receive a second record, the second record comprising a second trigger condition, a second format information representing a second document format and a second destination information, the second trigger condition corresponding to a second time-related reporting condition of management information to be transmitted in accordance with the second destination information;

store the second record and a second event identification in the storage unit, wherein the second event identification is associated with the second trigger condition, the second format information and the second destination information in the storage unit, the second format being different from the first format;

obtain time condition information related to the image processing device;

determine whether the obtained time condition information indicates a time-related report condition corresponding to the first trigger condition or the second trigger condition;

determine one of the first event identification and the second event identification respectively corresponding to the first trigger condition or the second trigger condition based on whether the obtained time condition information indicates the time-related report condition for the first trigger condition or for the second trigger condition;

determine one of the first destination information and the second destination information, and one of the first format information and the second format information, from the determined one of the first event identification and the second event identification;

generate, when the obtained time condition information indicated the time-related report condition corresponding to the first trigger condition, first management information in a document format represented by the first format information stored in the storage unit corresponding to the determined event identification and the first trigger condition, wherein the first management information comprises a first content related to the obtained condition information described in the first document format, and to generate, when the obtained time condition information indicated the time-related report condition corresponding to the second trigger condition, second management information in a document format represented by the second format information stored in the storage unit corresponding to the determined event identification and the second trigger condition, wherein the second management information comprises a second content related to the obtained condition information described in the second document format; and transmit, by using a particular protocol, the first management information to an external device in accordance with the determined destination information corresponding to the event identification, and to transmit, by using the particular protocol, which is the same protocol as the particular protocol used when the first management information is transmitted, the second management information to the external device in accordance with the determined destination information corresponding to the event identification, wherein when the obtained time condition information indicated the time-related report condition corresponding to the first trigger condition, the determined destination information is the first destination information and when the obtained time condition information indicated the time-related report condition corresponding to the second trigger condition, the determined destination information is the second destination information.

15. The image processing device according to claim 14, wherein the management information includes a report which is issued at a specific timing.

16. The image processing device according to claim 14, further comprising: a clock configured to obtain a current time, wherein the current time is the time condition information and wherein the determining whether the obtained time condition information indicates a time-related report condition is based on the current time obtained by the clock.

17. The image processing device according to claim 14, wherein the first and second format information are externally inputted to the storage unit.

18. The image processing device according to claim 14, further comprising a setting unit configured to accept an input for setting the first and second format information, wherein the first and second format information accepted through the setting unit is stored in the storage unit.

19. The image processing device according to claim 18, wherein:

the setting unit is configured to accept an input for setting destination information concerning a destination device to which the first or second management information should be transmitted; and the storage unit is configured to store the destination information while associating the destination information with the first or second format information.

20. The image processing device according to claim 14, wherein the processor transmits either the first or second management information to the external device when the time-related condition is satisfied for either the first trigger condition or the second trigger condition.

21. The image processing device according to claim 14, wherein:

the processor is configured to further consider a type of a destination device to which management information should be transmitted, to determine a format in which management information should be created in accordance with the type of the destination device, and to create the management information in the determined format, and to transmit the management information to the destination device by obtaining the destination information of the destination device from the storage unit.

* * * * *